(12) United States Patent
Harada et al.

(10) Patent No.: US 8,690,213 B2
(45) Date of Patent: Apr. 8, 2014

(54) ROBOT HAND AND ROBOT

(75) Inventors: Toshiyuki Harada, Fukuoka (JP); Kenichi Motonaga, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/368,337

(22) Filed: Feb. 8, 2012

(65) Prior Publication Data
US 2012/0286534 A1 Nov. 15, 2012

(30) Foreign Application Priority Data
May 12, 2011 (JP) .................. 2011-107140

(51) Int. Cl.
*B66C 1/42* (2006.01)
(52) U.S. Cl.
USPC ............. 294/119.1; 414/741; 901/32; 901/39
(58) Field of Classification Search
USPC ........... 294/119.1, 902, 207, 213; 901/25, 36, 901/38, 32, 35, 39; 414/741, 751.1, 744.8, 414/941
See application file for complete search history.

(56) References Cited

U.S. PATENT DOCUMENTS

| | | | |
|---|---|---|---|
| 1,807,360 A * | 5/1931 | Wehr | 294/106 |
| 4,645,411 A | 2/1987 | Madwed | |
| 4,842,473 A * | 6/1989 | Zbornik | 414/626 |
| 5,403,057 A * | 4/1995 | Sugito et al. | 294/119.1 |
| 5,947,539 A | 9/1999 | Long et al. | |
| 7,422,411 B2 * | 9/2008 | Downs et al. | 414/741 |
| 8,057,154 B2 * | 11/2011 | Brommer et al. | 414/741 |

FOREIGN PATENT DOCUMENTS

| | | |
|---|---|---|
| DE | 9017733 U1 | 1/1992 |
| EP | 0999170 A1 * | 5/2000 |
| JP | 61-117086 | 6/1986 |
| JP | 62-244887 | 10/1987 |
| JP | 04-063691 | 2/1992 |
| JP | 2002-283268 | 10/2002 |

OTHER PUBLICATIONS

Extended European Search Report for corresponding EP Application No. 12154802.8-2316, Jun. 26, 2012.
Japanese Office Action for corresponding JP Application No. 2011-107140, Apr. 16, 2013.

* cited by examiner

*Primary Examiner* — Stephen Vu
(74) *Attorney, Agent, or Firm* — Ditthavong Mori & Steiner, P.C.

(57) ABSTRACT

A robot hand and a robot according to an embodiment include a set of sliding parts, supporting units, a rotary unit, and a plurality of holding claws. The sliding parts slide in a direction to come close to or move away from each other. The supporting units are secured to the respective sliding parts. The rotary unit is attached to an end portion of at least one of the supporting units and rotates around an axis of rotation parallel to sliding shafts of the sliding parts. The holding claws are attached in directions orthogonal to the axis of rotation and different from one another.

12 Claims, 7 Drawing Sheets

US 8,690,213 B2

ROBOT HAND AND ROBOT

CROSS-REFERENCE TO RELATED APPLICATION

This application is based upon and claims the benefit of priority of the prior Japanese Patent Application No. 2011-107140, filed on May 12, 2011, the entire contents of which are incorporated herein by reference.

FIELD

The embodiment discussed herein is directed to a robot hand and a robot.

BACKGROUND

Conventionally, there are robots known to perform a so-called pick operation that is an action of holding and moving a workpiece such as a bolt and an electronic component placed in a component box by a robot hand provided at a movable end part of an arm thereof.

Such a robot performs a holding action by pinching a workpiece with a plurality of holding claws provided at an end portion of a robot hand (for example, see Japanese Patent Application Laid-open No. 2002-283268). The holding claws are secured to respective moving parts separately provided on the robot hand, and the above-mentioned pinching is performed by moving each of the moving parts in a direction to come close to one another.

However, in conventional robot hands and robots, there may be a situation where it is difficult to hold a workpiece depending on the size or the shape of the workpiece that is a subject to hold because the size and shape of the holding claws are fixed.

In this regard, the technology disclosed in the above-mentioned Japanese Patent Application Laid-open No. 2002-283268 recites that a variety of workpieces can be accommodated by adjusting a moving amount of the moving parts. However, when the shape of the holding claws does not fit to a workpiece in the first place, it is sill difficult to hold the workpiece.

SUMMARY

A robot hand according to an aspect of an embodiment includes a set of sliding parts, supporting units, a rotary unit, and a plurality of holding claws. The sliding parts slide in a direction to come close to or move away from each other. The supporting units are secured to the respective sliding parts. The rotary unit is attached to an end portion of at least one of the supporting units and rotates around an axis of rotation parallel to sliding shafts of the sliding parts. The holding claws are attached in directions orthogonal to the axis of rotation and different from one another.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

With reference to the accompanying drawings, an embodiment of a robot hand and a robot disclosed in the present application will be described in detail hereinafter. However, the invention is not intended to be restricted by the following embodiment described.

Figure 1:
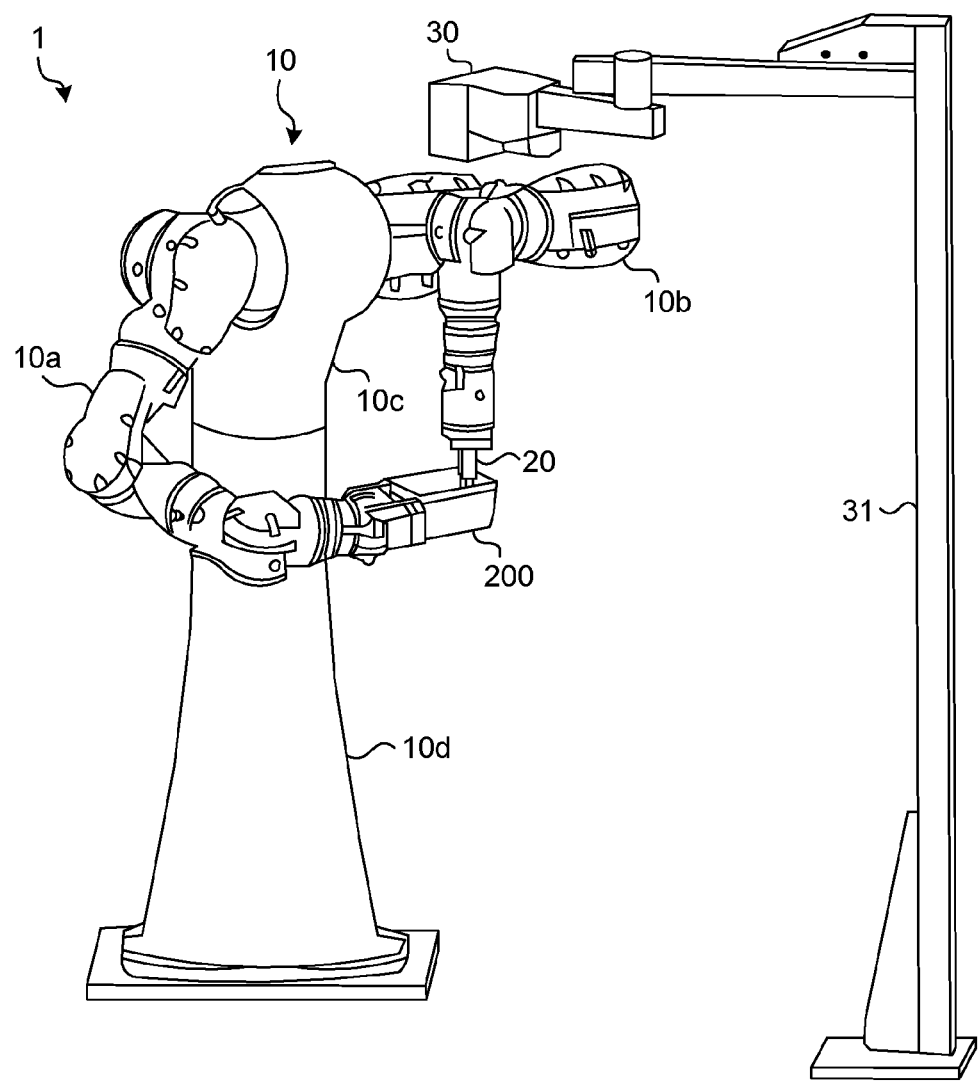
FIG. 1 is a diagram illustrating an example of arrangement of a workpiece picking system.

An example of arrangement of a workpiece picking system including a robot provided with a robot hand according to the embodiment will be described first with reference to FIG. 1. FIG. 1 is a diagram illustrating an example of arrangement of a workpiece picking system 1.

As illustrated in FIG. 1, the workpiece picking system 1 includes a robot 10 and a three-dimensional measuring unit 30. The robot 10 is a multi-axis robot of seven-axis, for example, and is provided with a robot hand 20 at a movable end part thereof. The robot hand 20 is a so-called end effector, and the robot 10 is a general-purpose robot with the end effector being replaceable. The detail of the robot hand 20 will be described later with reference to FIG. 2A and the subsequent drawings.

As illustrated in FIG. 1, the robot 10 is a so-called dual-arm robot including a right arm 10a and a left arm 10b. The right arm 10a and the left arm 10b are each a multi-axis robot (a seven-axis robot in FIG. 1) and, as an end effector of the left arm 10b, the robot hand 20 is provided.

The right arm 10a is provided with a predetermined end effector and holds a component box 200 that contains workpieces in bulk. Accordingly, the robot 10 performs an action of picking out a workpiece with the robot hand 20 provided on the left arm 10b from the component box 200 held by the right arm 10a.

The robot 10 has a mechanism that rotates a body portion 10c, which is provided with the right arm 10a and the left arm 10b, along a horizontal plane with respect to a base portion 10d that is secured on a floor surface or the like.

The three-dimensional measuring unit 30 is a device that measures a position of each of the workpieces in the component box 200, and is secured via a stand 31 and such so that a measuring area thereof is on a vertical side.

Figure 2A:
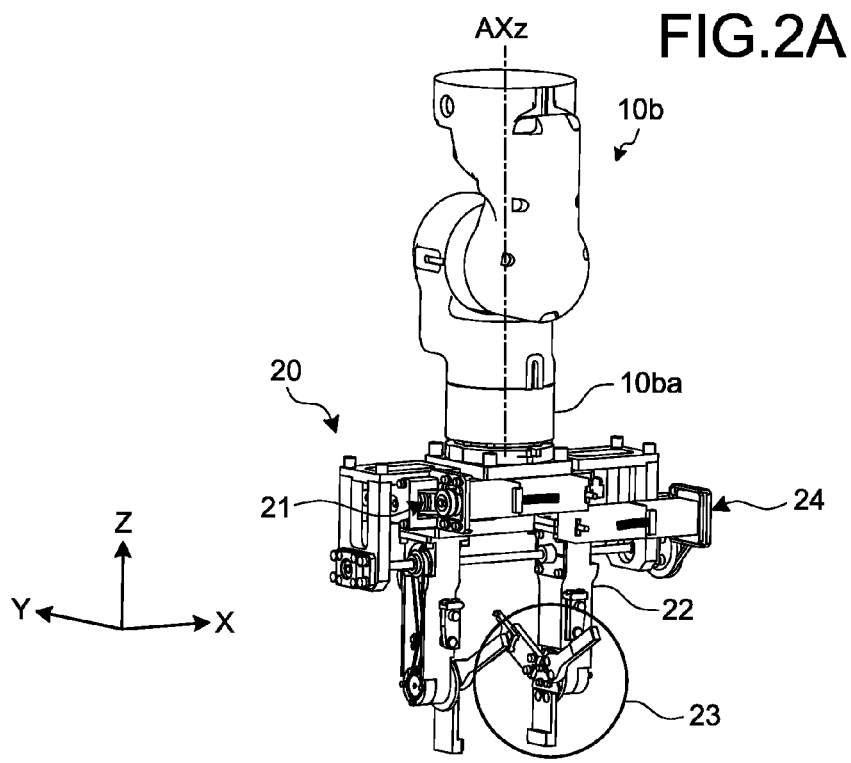
FIG. 2A is a perspective view of a robot hand according to an embodiment.
Figure 2B:
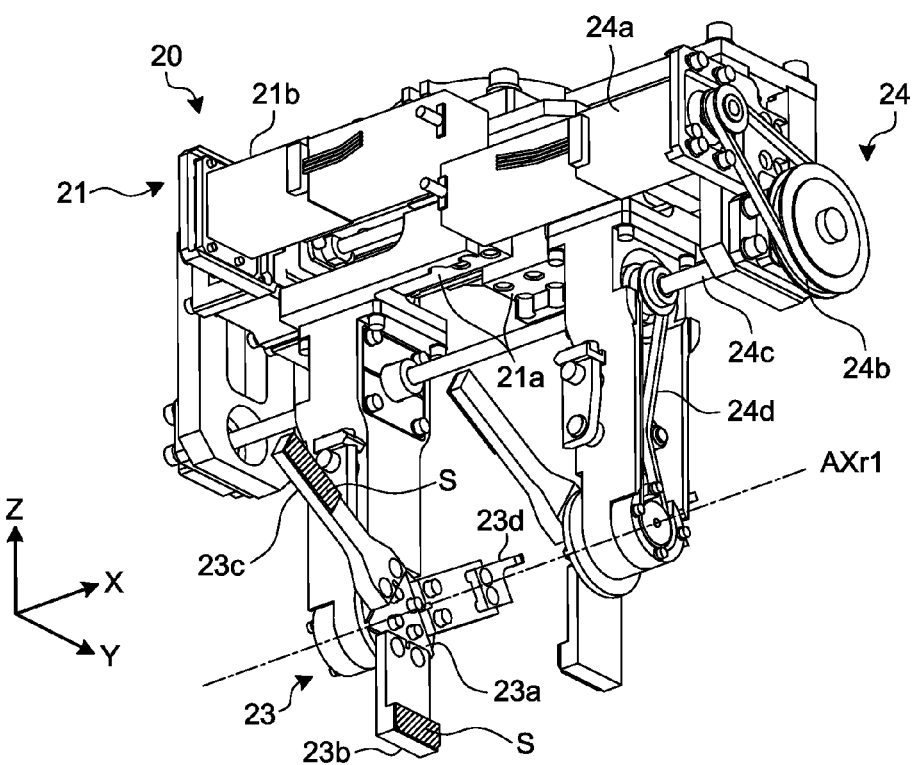
FIG. 2B is a diagram illustrating an example of configuration of the robot hand according to the embodiment.

Next, an example of configuration of the robot hand 20 according to the embodiment will be described with reference to FIGS. 2A and 2B. FIG. 2A is a perspective view of the robot hand 20 according to the embodiment. FIG. 2B is a diagram illustrating an example of configuration of the robot hand 20 according to the embodiment.

To make the explanation easy to understand, in FIGS. 2A and 2B, a three-dimensional orthogonal coordinate system including a Z-axis with a vertically upward direction as a positive direction is indicated. Such an orthogonal coordinate system may be indicated also in other drawings used in the following explanation.

In the following, for constituent elements that are configured in pairs, a symbol may only be given to a member on one side of a pair and may be omitted for a member on the other side. In this case, the configurations of both sides are assumed to be the same.

As illustrated in FIG. 2A, the robot hand 20 according to the embodiment is attached to a movable end part 10ba of the left arm 10b. The movable end part 10ba here rotates around an axis AXz indicated in FIG. 2A as an axis of rotation. Therefore, the robot hand 20 also rotates together with the rotation of the movable end part 10ba. In FIG. 2A, illustrated is a situation where the axis AXz is parallel to the Z-axis indicated.

As illustrated in FIG. 2A, the robot hand 20 further includes a sliding mechanism 21 including moving parts not depicted (hereinafter described as sliding parts), a pair of supporting units 22, and a rotary mechanism 24. The supporting units 22 include each, at an end portion thereof, a holding claw unit 23 that holds a workpiece which is a subject to hold.

The holding claw unit 23 includes a plurality of holding claws, and the holding claws of the robot hand 20 that are used for holding actions can be switched depending on the size or the shape of a workpiece.

The configuration example of the robot hand 20 will be described in detail hereinafter. As illustrated in FIG. 2B, the sliding mechanism 21 included in the robot hand 20 includes a pair of sliding parts 21a.

The sliding mechanism 21 further includes a single sliding servo motor 21b and, based on the drive of the sliding servo motor 21b, makes each of the sliding parts 21a slide, along a sliding shaft (not depicted) parallel to an X-axis indicated in FIG. 2B, in a direction to come close to or move away from each other.

The sliding of each of the sliding parts 21a in the direction to come close to each other corresponds to an action of holding a workpiece. The sliding of each of the sliding parts 21a in the direction to move away from each other corresponds to an action of releasing the workpiece held. The detail of the sliding mechanism 21 will be described later with reference to FIGS. 4A and 4B.

As illustrated in FIG. 2B, each of the pair of the supporting units 22 is secured onto each sliding part 21a. Therefore, the supporting unit 22 shows the same behavior as that of the sliding part 21a.

As illustrated in FIG. 2B, the holding claw unit 23 further includes a rotary unit 23a that rotates around an axis AXr1 parallel to the X-axis indicated.

The rotation of the rotary unit 23a is based on the movement of the rotary mechanism 24 included in the robot hand 20. As illustrated in FIG. 2B, the rotary mechanism 24 includes a single rotary servo motor 24a, a rotary drive belt pulley unit 24b, a spline shaft 24c, and a rotary driven belt pulley unit 24d.

The rotary unit 23a rotates by receiving the transfer of rotation based on the drive of the rotary servo motor 24a via the rotary drive belt pulley unit 24b, the spline shaft 24c, and the rotary driven belt pulley unit 24d. The detail of this point will be described later with reference to FIGS. 3A and 3B.

As illustrated in FIG. 2B, on the rotary unit 23a, three holding claws of a holding claw 23b, a holding claw 23c, and a holding claw 23d are attached. While a situation with those three holding claws being attached is exemplified in the following, the number of holding claws is not restricted.

Each of the holding claws is paired with the respective one of the holding claws at the end portion of the supporting unit 22 on the other side. More specifically, in the example illustrated in FIG. 2B, the holding claw 23b corresponds and faces to the holding claw 23b of the same shape, and similarly, the holding claw 23c and the holding claw 23d correspond and face to the holding claw 23c and the holding claw 23d, respectively.

Each combination of the holding claws rotates in synchronization along with the rotation of the rotary units 23a. For example, when the holding claw 23b is appropriate for the size and the shape of a workpiece that is a subject to hold, the rotary unit 23a rotates such that the direction of the tip of the holding claw 23b is pointed towards a direction suitable for the action of holding the workpiece.

At this time, the combination of the holding claws 23b makes the respective tips thereof point towards the same direction in synchronization. This is the same when the holding claw appropriate for a workpiece is the holding claw 23c or the holding claw 23d. The rotating angle of the rotary unit 23a is controlled based on the measuring result of the three-dimensional measuring unit 30 (see FIG. 1).

In this manner, the holding claws of the robot hand 20 according to the embodiment that are used for holding actions can be switched depending on the size and the shape of a workpiece.

A workpiece is held by an opposing surface S of each of the holding claws illustrated in FIG. 2B. For the opposing surface S here, a variety of materials can be used. For example, rubber or the like may be used to make it not slippery when holding a workpiece. For a workpiece having heat, a material of excellent heat resistance such as ceramics may be used.

Furthermore, the opposing surface S may be subjected to a process directly. For example, the opposing surface S may be subjected to a striating process to form irregularities to increase frictional force.

Figure 3A:
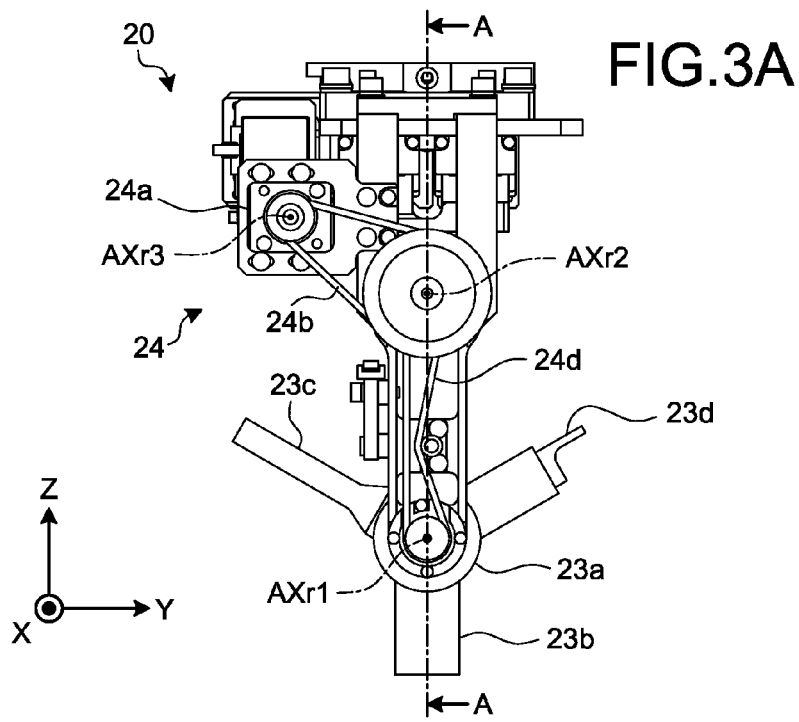
FIG. 3A is a side view of the robot hand according to the embodiment.
Figure 3B:
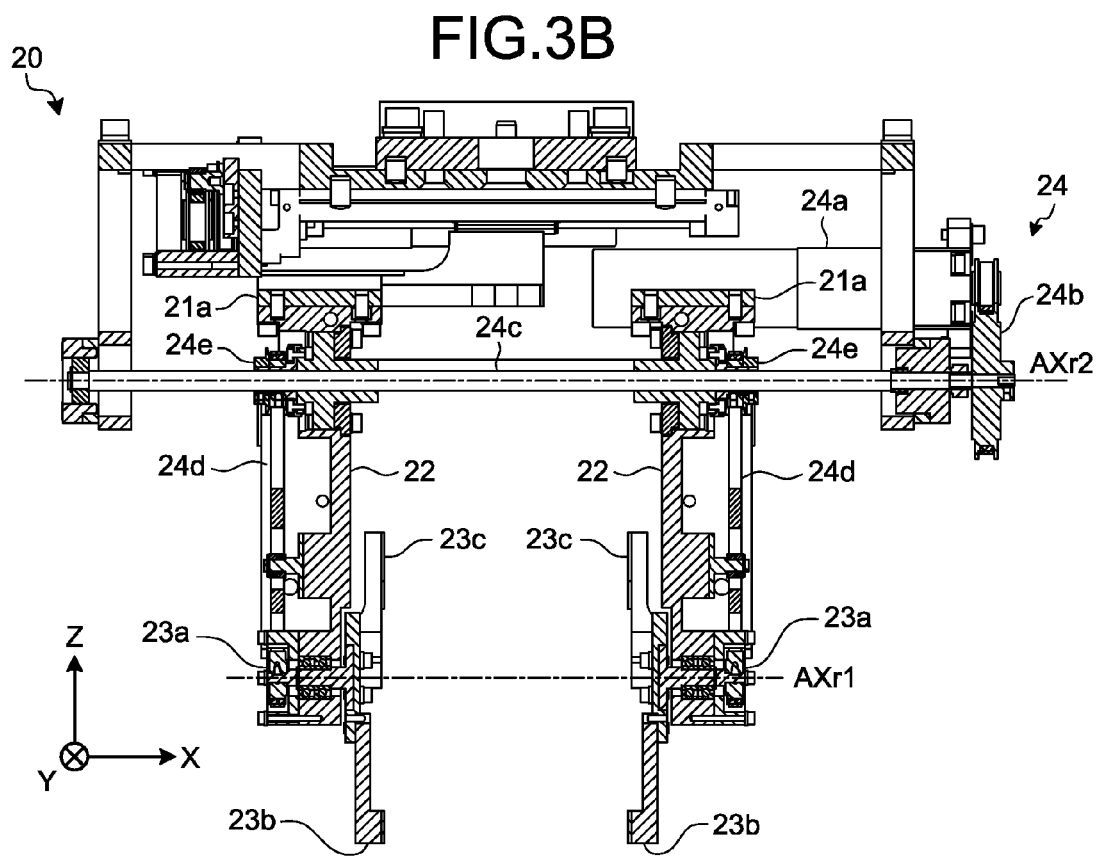
FIG. 3B is a cross-sectional view of the robot hand according to the embodiment.

Next, the detail of the rotary mechanism 24 included in the robot hand 20 according to the embodiment will be described with reference to FIGS. 3A and 3B. FIG. 3A is a side view of the robot hand 20 according to the embodiment. FIG. 3B is a cross-sectional view of the robot hand 20 according to the embodiment. FIG. 3A illustrates the robot hand 20 viewed from a positive direction of the X-axis, while FIG. 3B illustrates a cross-section of A-A indicated in FIG. 3A viewed from a negative direction of a Y-axis.

While it is partly redundant to the above-described explanation with reference to FIG. 2B, as illustrated in FIG. 3A, the rotary mechanism 24 included in the robot hand 20 transfers the rotation of the rotary servo motor 24a, which rotary drives around an axis AXr3 parallel to the X-axis indicated, to the spline shaft 24c (not depicted in FIG. 3A) via the rotary drive belt pulley unit 24b straddled between the rotary servo motor 24a and the spline shaft 24c.

The spline shaft 24c received the transfer of the rotation rotates around an axis AXr2 indicated in FIG. 3A, and the rotation thereof is transferred to the rotary units 23a via the rotary driven belt pulley units 24d straddled between the spline shaft 24c and each of the rotary units 23a.

The rotary unit 23a received the transfer of the rotation then rotates around the axis AXr1 indicated in FIG. 3A so as to switch the holding claws used for holding actions. Now, the shape and attaching direction of the respective holding claws being attached to the rotary unit 23a will be described.

As for each of the holding claws attached to the rotary unit 23a, a plurality of holding claws in different predetermined widths corresponding to the size of a workpiece can be attached. For example, as the holding claw 23b, the holding claw 23c, and the holding claw 23d illustrated in FIG. 3A, the predetermined widths can be made in the order corresponding to the foregoing as large, medium, and small.

Furthermore, the shape of each of the holding claws, for example, the shape of the above-described opposing surface S, may be made different depending on the shape of a workpiece. Specific examples of the shape of holding claws will be described later with reference to FIGS. 5A to 5F. Such measures taken corresponding to the size of a workpiece and those taken corresponding to the shape of a workpiece can obviously be combined.

As for the direction of attaching, as illustrated in FIG. 3A, each of the holding claws can be attached in a direction radially extending from the rotation center of the rotary unit 23a (i.e., an intersection with the axis AXr1 that is the rotation axis), in other words, in a direction orthogonal to the axis AXr1 and radially extending.

As for the direction radially extending, it is not restricted as such. For example, each of the holding claws may be attached in a direction orthogonal to the axis AXr1, but deflected from the above-described rotation center. Accordingly, the attaching direction of each of the holding claws can be rephrased as a direction orthogonal to the axis AXr1 and different from one another.

Now, with reference to FIG. 3B, the rotary mechanism 24 will be further described in detail. As illustrated in FIG. 3B, on each of the sliding parts 21a, one of the supporting units 22 is secured.

The supporting unit 22 is penetrated through by the spline shaft 24c along the axis AXr2 parallel to the X-axis indicated in FIG. 3B. On the spline shaft 24c, a pair of nut portions 24e is provided, and the respective nut portions 24e are connected to the corresponding supporting units 22.

Between the rotary servo motor 24a and one end of the spline shaft 24c, the rotary drive belt pulley unit 24b is straddled, and between the nut portions 24e of the spline shaft 24c and the rotary units 23a, the rotary driven belt pulley units 24d are straddled.

The rotary unit 23a is pivotally supported to rotate at the end portion of the supporting unit 22 via bearings and such not illustrated. On the rotary unit 23a, the holding claw 23b, the holding claw 23c, and the like are attached in directions orthogonal to the axis AXr1 of the rotation axis and different from one another.

In the foregoing configuration, when the rotary servo motor 24a drives, the rotation based on the drive is transferred by the rotary drive belt pulley unit 24b and rotates the spline shaft 24c around the axis AXr2. Thus, the rotation of the spline shaft 24c rotates the pair of nut portions 24e in synchronization.

The rotation of the nut portions 24e is transferred by the rotary driven belt pulley units 24d and rotates the pair of rotary units 23a around the axis AXr1 in synchronization. As a consequence, the combination of the holding claws 23b, the combination of the holding claws 23c, and the combination of the holding claws 23d attached to the pair of rotary units 23a to face with each other rotate in synchronization so as to point the tips thereof in given directions that are orthogonal to the axis AXr1.

As described in the foregoing, the tips of the respective holding claws can be pointed in given directions. Thus, the holding claws used for a holding action are switched corresponding to the shape and such of a workpiece that is a subject to hold, and even when the workpiece is located near an inner wall surface of the component box 200, it is possible to hold the workpiece without the robot hand 20 touching the inner wall surface. This point will be described later with reference to FIG. 6.

Figure 4A:
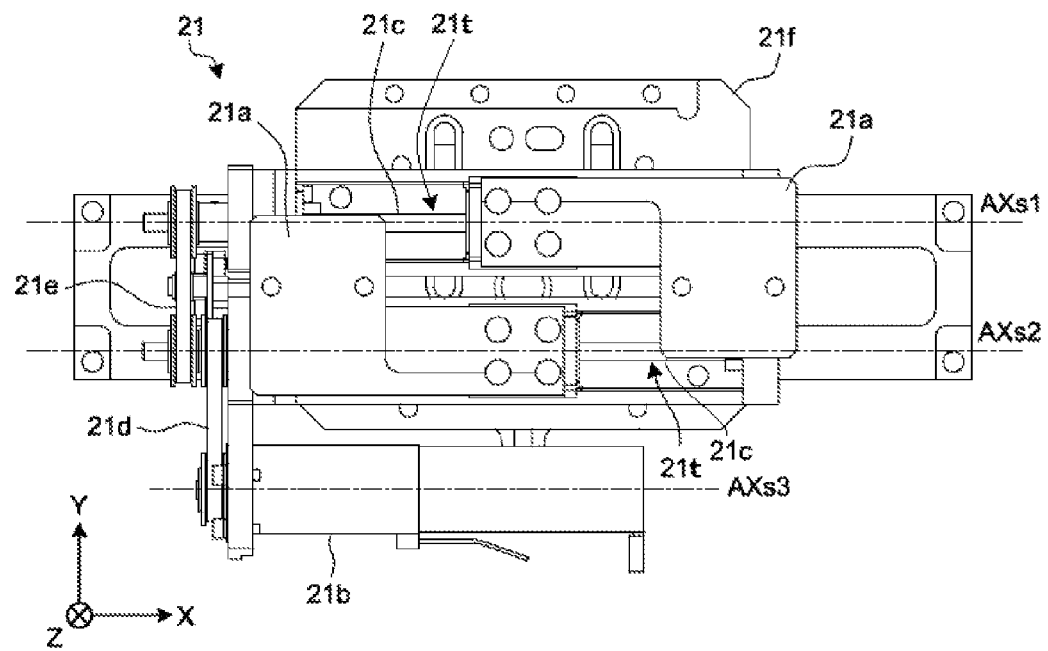
FIG. 4A is a plan view of a sliding mechanism.
Figure 4B:
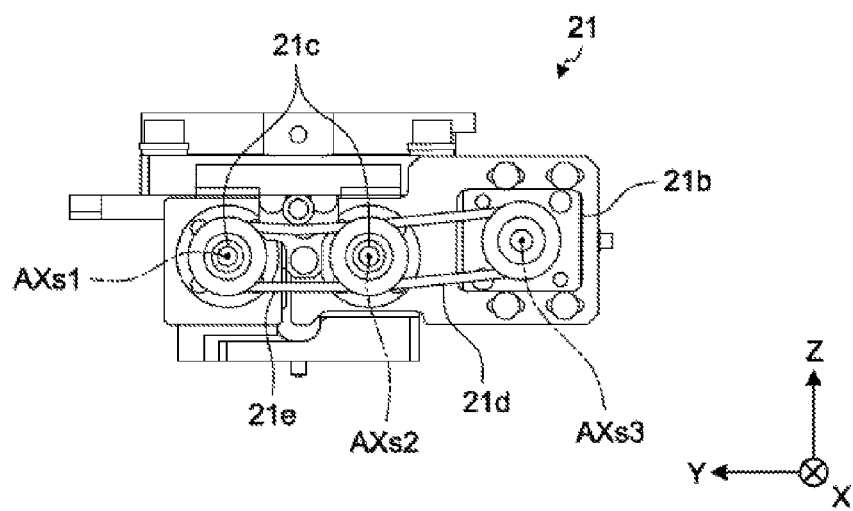
FIG. 4B is a side view of the sliding mechanism.

Next, the detail of the sliding mechanism 21 included in the robot hand 20 according to the embodiment will be described with reference to FIGS. 4A and 4B. FIG. 4A is a plan view of the sliding mechanism 21. FIG. 4B is a side view of the sliding mechanism 21. FIG. 4A illustrates the sliding mechanism 21 viewed from a negative direction of the Z-axis, while FIG. 4B illustrates the sliding mechanism 21 viewed from a negative direction of the X-axis.

As illustrated in FIG. 4A, the sliding mechanism 21 provided in the robot hand 20 includes a pair of sliding parts 21a, a single sliding servo motor 21b, a pair of shafts 21c, a sliding drive belt pulley unit 21d, a sliding driven belt pulley unit 21e, and a housing 21f.

The pair of sliding parts 21a are each a member that slides along the shaft 21c that is the sliding shaft. The sliding servo motor 21b is a rotary drive mechanism that rotary drives around an axis AXs3 parallel to the X-axis indicated in FIG. 4A.

The pair of shafts 21c are each the sliding shaft corresponding to one of the pair of the sliding parts 21a. They are arranged to penetrate through the sliding part 21a and to be approximately parallel to each other, and supported to rotate via bearings (not illustrated) provided on the housing 21f.

On the outer circumferential surface of one of the pair of shafts 21c, right-hand threads are formed and, on the outer circumferential surface of the other, left-hand threads are formed. Furthermore, in a hole of the respective sliding parts 21a of the pair through which the shaft 21c penetrates, the threads of the same direction as that of the penetrating shaft 21c are formed.

The shaft 21c and the sliding part 21a are fitted at the thread-formed portions 21t. In the following, the thread-formed portion 21t may be described as a threaded portion.

As illustrated in FIGS. 4A and 4B, between the sliding servo motor 21b and one of the pair of the shafts 21c, the sliding drive belt pulley unit 21d is straddled. Between both shafts 21c of the pair, the sliding driven belt pulley unit 21e is straddled.

In the above-described configuration, when the sliding servo motor 21b drives, the rotation based on the drive is transferred by the sliding drive belt pulley unit 21d and rotates the one of the shafts 21c straddled with the sliding drive belt pulley unit 21d around an axis AXs2 that is a shaft center.

The rotation of the one of the shafts 21c is transferred by the sliding driven belt pulley unit 21e and rotates the other one of the shafts 21c around an axis AXs1 that is a shaft center. In other words, based on the drive of the single sliding servo motor 21b, the pair of shafts 21c rotates in the same direction in synchronization.

The rotation of the pair of shafts 21c is converted to linear motions by screw action, and the pair of sliding parts 21a fitted at the threaded portions are made to slide along the respective shafts 21c.

At this time, as described in the foregoing, the pair of shafts 21c slide in the directions opposite to each other because the threaded portions of the respective shafts 21c of the pair are threaded in the directions opposite to each other. More specifically, by the action of the pair of sliding parts 21a sliding in a direction to come close to each other, the holding claws located at the ends of the pair of supporting units 22 secured to the pair of sliding parts 21*a* hold a workpiece and, by the action of the pair of sliding parts 21*a* sliding in the direction to move away from each other, the workpiece held is released.

As described in the foregoing, in the sliding mechanism 21, the pair of sliding parts 21*a* are configured to slide along the pair of shafts 21*c* that are approximately parallel to each other. Thus, the robot hand 20 can achieve a long stroke for holding action while being compact.

Next, specific examples of making the shape of the holding claws different depending on the shape of a workpiece 100 will be described with reference to FIGS. 5A to 5F. FIGS. 5A to 5F are diagrams illustrating specific example patterns A to F of the shape of the holding claws, respectively. FIGS. 5A to 5F illustrate the diagrams all viewed from the negative direction of the Y-axis depicted in the foregoing drawings. Accordingly, the direction of view is orthogonal to the above-described opposing surfaces S.

Figure 5A:
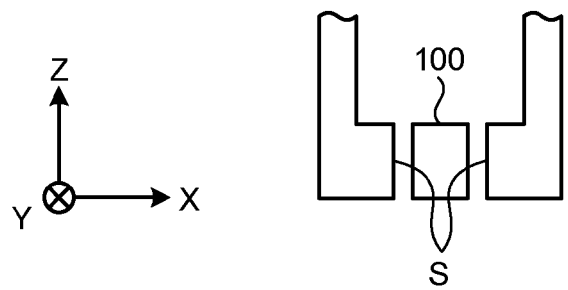
FIG. 5A is a diagram illustrating a specific example pattern A of the shape of holding claws.
Figure 5B:
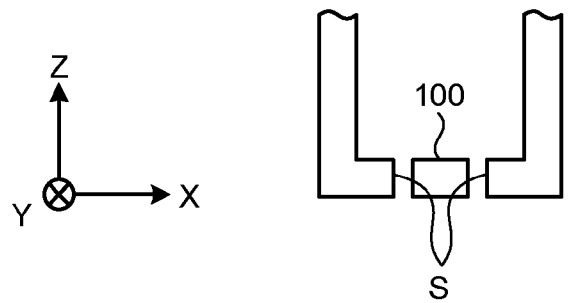
FIG. 5B is a diagram illustrating a specific example pattern B of the shape of holding claws.

As illustrated in FIGS. 5A and 5B, the shape of the holding claws can be made different corresponding to the height of the workpiece 100. The shape of the workpiece 100 here is assumed to be rectangular when viewed from the negative direction of the Y-axis.

For example, as illustrated in FIG. 5A, when the workpiece 100 has a given height, the holding claws can be similarly shaped to have the opposing surfaces S having the given height. Meanwhile, as illustrated in FIG. 5B, when the workpiece 100 does not have much height, the holding claws can be similarly shaped to have the opposing surfaces S having not much height.

Figure 5C:
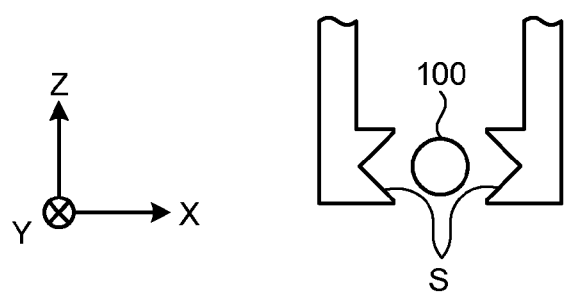
FIG. 5C is a diagram illustrating a specific example pattern C of the shape of holding claws.
Figure 5D:
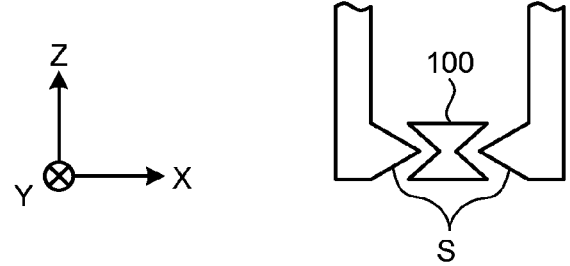
FIG. 5D is a diagram illustrating a specific example pattern D of the shape of holding claws.

As illustrated in FIGS. 5C and 5D, when the workpiece 100 has a shape unstable to be held, the shape of the holding claws can be made corresponding to the shape of the workpiece 100.

For example, as illustrated in FIG. 5C, the shape of the workpiece 100 is assumed to be circular when viewed from the negative direction of the Y-axis. In this case, the holding claws can be shaped to have the opposing surfaces S with an indentation so as to securely hold the workpiece 100 between the opposing surfaces S.

In contrast, as illustrated in FIG. 5D, when the held area of the workpiece 100 has an indentation, the holding claws can be shaped to have the opposing surfaces S having a protrusion so as to reliably hold the workpiece 100 by inserting the opposing surfaces S to the held area.

Figure 5E:
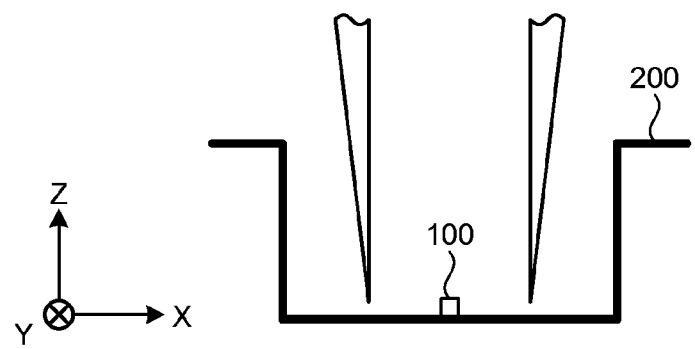
FIG. 5E is a diagram illustrating a specific example pattern E of the shape of holding claws.
Figure 5F:
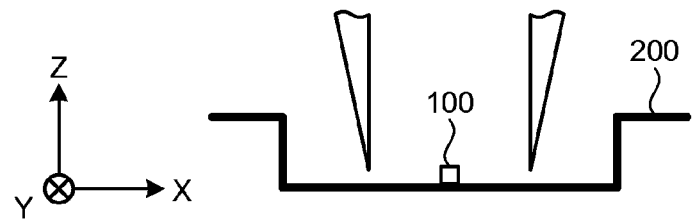
FIG. 5F is a diagram illustrating a specific example pattern F of the shape of holding claws.

As illustrated in FIGS. 5E and 5F, not only the shape of the holding claws but also the length of the holding claws can be made different corresponding to the depth of the component box 200. For example, as illustrated in FIG. 5E, when holding the workpiece 100 in the component box 200 having a given depth, the holding claws can be made to have a given length.

Meanwhile, as illustrated in FIG. 5F, when holding the workpiece 100 in the component box 200 of a shallow depth, the holding claws can be made short. As illustrated in FIGS. 5E and 5F, when the workpiece 100 is quite small, the holding claws can be made in a pointed shape as a tweezers.

In FIGS. 5A to 5F, the opposing surfaces S are all in acute-angled shapes when viewed from the negative direction of the Y-axis. However, the shape of the holding claws is not restricted and, for example, the shape of the holding claws may be rounded.

Figure 6:
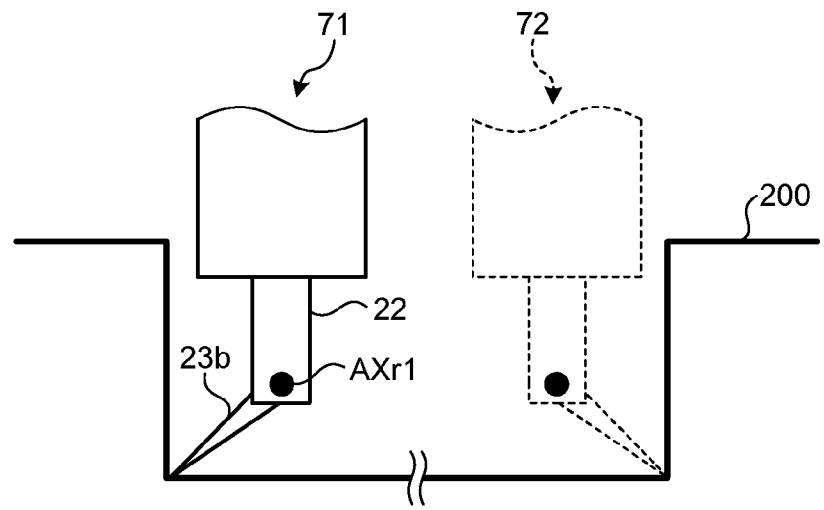
FIG. 6 is a diagram illustrating a positional relationship between a component box and a holding claw.

Next, advantages of the tips of holding claws that can be pointed in given directions will be explained with reference to FIG. 6. FIG. 6 is a diagram illustrating positional relationship between the component box 200 and the holding claw 23*b*. In terms of simplifying the explanation, in FIG. 6, the holding claws are already switched to the holding claws 23*b* as the holding claws used for a holding action, and the illustration of other holding claws are omitted. Furthermore, FIG. 6 is illustrated such that the axis AXr1 is perpendicular to the plane of the drawing.

While it is partly redundant to the above-described explanation with reference to FIG. 3B, when the tips of the holding claws can be pointed in given directions by rotating the rotary units 23*a*, as illustrated in FIG. 6, it is possible to hold the workpiece 100 located near the inner wall surface of the component box 200 (see FIGS. 5A to 5F) without making the left arm 10*b* (see FIG. 1) and the robot hand 20 touch the component box 200.

For example, when holding the workpiece 100 near the surface of a left side wall in FIG. 6, the robot hand 20 is positioned to a position 71, and then the tips of the holding claws 23*b* are pointed such that the tips of the holding claws 23*b* come closer to the surface of the left side wall. This allows appropriate holding of the workpiece 100 near the surface of the left side wall.

When holding the workpiece 100 near the surface of a right side wall in FIG. 6, the robot hand 20 is positioned to a position 72, and then the tips of the holding claws 23*b* are pointed such that the tips of the holding claws 23*b* come closer to the surface of the right side wall. This allows appropriate holding of the workpiece 100 near the surface of the right side wall.

As described in the foregoing, the robot hand and the robot according to the embodiment includes a set of sliding parts, supporting units, a rotary unit, and a plurality of holding claws. The sliding parts slide in a direction to come close to or move away from each other. The supporting units are secured to the respective sliding parts. The rotary unit is attached to the end portion of at least one of the supporting units and rotates around the rotation axis parallel to sliding shafts of the sliding parts. The holding claws are attached in directions orthogonal to the rotation axis and different from one another.

Therefore, the robot hand and the robot according to the embodiment can hold workpieces of different sizes and shapes.

In the above-described embodiment, the holding claws of the same shape are paired. However, it is not restricted as such and, for example, holding claws of different shapes may be paired corresponding to the shape and such of a workpiece.

While both rotary units of the pair of supporting units are rotated in synchronization in the above-described embodiment, it may not be restricted to this. For example, when holding a plurality of types of workpieces in asymmetrical shapes, it is assumed that one end of the held area of all types of the workpieces is always of the same shape.

In this case, without switching the holding claw that corresponds to the one end of the same shape, only the rotary unit of one of the supporting units may be rotated to switch only the holding claw that corresponds to the other end of the held area. This can be realized by attaching the rotary unit to only the end portion of at least one of the supporting units.

While the holding claws in all different shapes are attached to a single rotary unit of the supporting unit in the above-described embodiment, it is not restricted as such. For example, although being in the same shape, ones with the opposing surfaces of different materials and such may be attached.

In the above-described embodiment, each of the holding claws is attached to the rotary unit. However, the way of attaching is not limited to this and, for example, the holding claws may be fixed on top of one another with respect to the rotation axis like an hour hand, a minute hand, and a second hand of an analog clock.

Furthermore, in the above-described embodiment, the sliding mechanism has, as sliding shafts, a pair of shafts having threaded portions with the threading directions thereof being opposite to each other. However, the threading direction of the threaded portions may be made the same, and one of the shafts may be made to rotate in an opposite direction via a gear or the like.

Figure 7:
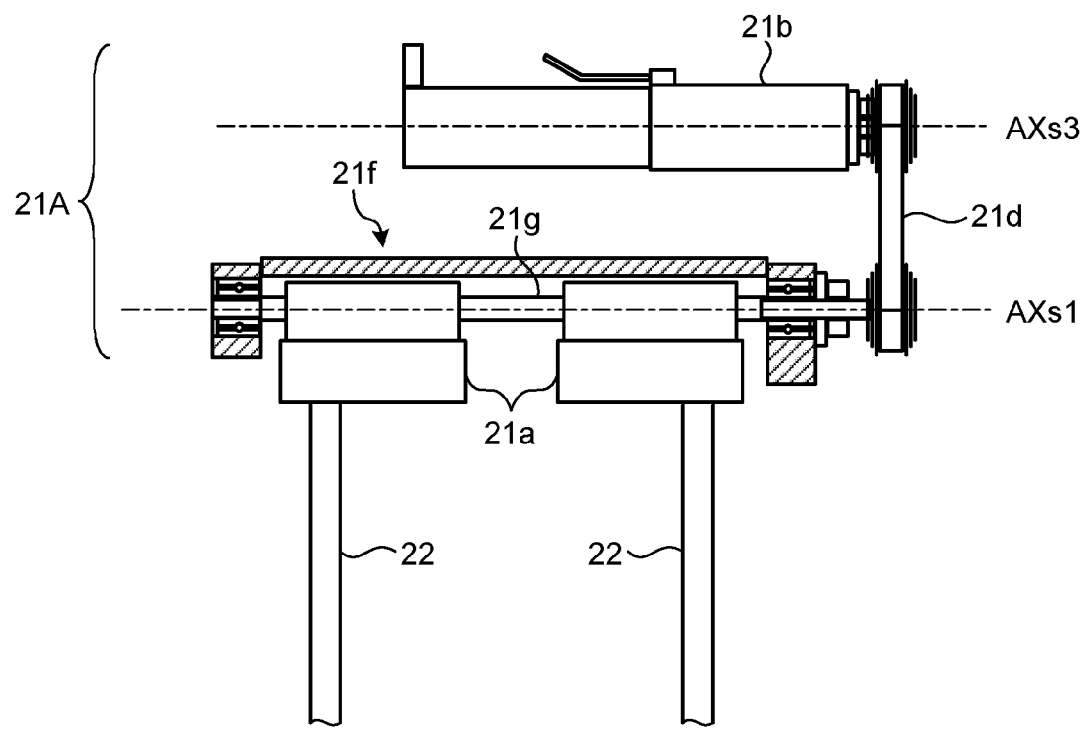
FIG. 7 is a diagram illustrating an example of configuration of a sliding mechanism according to a modification example.

Moreover, the sliding shaft of the sliding mechanism may be made to be one. Such a modification example will be explained with reference to FIG. 7. FIG. 7 is a diagram illustrating an example of configuration of a sliding mechanism 21A according to the modification example. In the explanation with reference to FIG. 7, the constituent elements in common with the sliding mechanism 21 according to the above-described embodiment are either omitted to explain or explained briefly.

As illustrated in FIG. 7, the sliding mechanism 21A according to the modification example includes the pair of sliding parts 21a, the sliding servo motor 21b, a single left-right threaded shaft 21g, the sliding drive belt pulley unit 21d, and the housing 21f.

The rotary drive force of the sliding servo motor 21b rotating around the axis AXs3 is transferred to the left-right threaded shaft 21g via the sliding drive belt pulley unit 21d.

The left-right threaded shaft 21g is supported to rotate by bearings (not depicted) provided on the housing 21f, and rotates about the axis AXs1 that is the shaft center by the rotary drive force of the sliding servo motor 21b transferred via the sliding drive belt pulley unit 21d.

On one end and the other end of the left-right threaded shaft 21g where the pair of sliding parts 21a fit, the respective threads of opposite directions (left and right threads) are formed.

Furthermore, in the hole of the respective sliding parts 21a of the pair through which the left-right threaded shaft 21g penetrates, the threads of the same direction are formed. Therefore, the pair of sliding parts 21a slide in the directions opposite to each other along the left-right threaded shaft 21g by screw action along with the rotation of the left-right threaded shaft 21g.

More specifically, by the action of the pair of sliding parts 21a sliding in the direction to come close to each other along the left-right threaded shaft 21g, a holding action to hold a workpiece can be performed and, by the action of the pair of sliding parts 21a sliding in the direction to move away from each other, a releasing action to release the workpiece held can be performed.

The sliding shaft being configured by a single left-right threaded shaft 21g in this way allows the reduction in the number of components, achieving the reduction in the weight of the robot hand 20 and cost.

In the above-described embodiment, one pair of sliding parts and one pair of supporting units secured to the sliding parts are shown. However, it is not restricted as such. For example, the disclosed technology in the present application may be applied when the number of sliding parts and that of supporting units secured to the sliding parts are three or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot hand comprising:
   sliding parts that slide in sliding directions to come close to or move away from each other;
   supporting units that are secured to the respective sliding parts;
   rotary units that are attached to end portions of the respective supporting units and rotate around an axis of rotation parallel to the sliding directions;
   a plurality of holding claws that are fixed to each of the rotary units rotatably around the axis of rotation in directions orthogonal to the axis of rotation and different from one another;
   a single rotary servo motor that rotates the rotary units around the axis of rotation;
   a spline shaft that is rotated by the rotary servo motor; and
   a plurality of belt pulley units that are provided corresponding to the respective rotary units and transfer the rotation of the spline shaft to the rotary units.

2. The robot hand according to claim 1, further comprising sliding shafts along which the respective sliding parts slide, wherein the sliding shafts are parallel to each other.

3. The robot hand according to claim 2, further comprising:
   a single sliding servo motor that rotates each of the sliding shafts around a corresponding shaft center, wherein
   each of sliding shafts of the sliding parts is threaded in a predetermined direction on an outer circumferential surface thereof, and
   the sliding parts fit the respective sliding shafts at the threaded portion and slide along the sliding shafts by screw action along with the rotation of the sliding shafts.

4. The robot hand according to claim 1, further comprising:
   sliding shafts along which the respective sliding parts slide;
   a single sliding servo motor that rotates each of the sliding shafts around a corresponding shaft center, wherein
   each of the sliding shafts is threaded in a predetermined direction on an outer circumferential surface thereof, and
   the sliding parts fit the respective sliding shafts at the threaded portion and slide along the sliding shafts by screw action along with the rotation of the sliding shafts.

5. The robot hand according to claim 1,
   wherein the rotary units are driven by the rotation transferred by the respective belt pulley units so as to point tips of the holding claws in directions orthogonal to the axis of rotation thereof.

6. The robot hand according to claim 5, wherein
   the holding claws have corresponding holding claws in pairs, and
   the rotary units rotate the holding claws and the corresponding holding claws in synchronization so as to point both tips in the same direction.

7. A robot comprising:
   the robot hand according to claim 1.

8. The robot hand according to claim 1, wherein the supporting units longitudinally extend from the respective sliding parts in directions orthogonal to the axis of rotation.

9. The robot hand according to claim 1, wherein the holding claws are directly fixed to each of the rotary units.

10. The robot hand according to claim 1,
    wherein the end portions of the respective supporting units to which the rotary units are attached are located at a distal location from the respective sliding parts, and
    wherein the plurality of holding claws are rotatable completely around the axis of rotation.

11. The robot hand according to claim 1,
wherein the end portions of the respective supporting units to which the rotary units are attached are located at a distal location from the respective sliding parts, and
wherein the plurality of holding claws are rotatable around the axis of rotation without interference with any other portion of the robot hand.

12. The robot hand according to claim 1,
wherein each belt pulley unit of the plurality of belt pulley units includes a belt that extends between the spline shaft and the rotary units.

* * * * *